(12) United States Patent
Tennant et al.

(10) Patent No.: US 6,448,572 B1
(45) Date of Patent: Sep. 10, 2002

(54) RANGING THREE-DIMENSIONAL LASER IMAGER AND METHOD

(75) Inventors: William E. Tennant; Alfredo Tomasini, both of Thousand Oaks, CA (US)

(73) Assignee: Innovative Technology Licensing, LLC, Thousand Oaks, CA (US)

( * ) Notice: Subject to any disclaimer, the term of this patent is extended or adjusted under 35 U.S.C. 154(b) by 0 days.

(21) Appl. No.: 09/408,329

(22) Filed: Sep. 29, 1999

(51) Int. Cl.$^7$ .............................................. G01N 21/86
(52) U.S. Cl. .................................. 250/559.38; 356/5.01
(58) Field of Search ........................ 250/208.1, 559.38; 356/4.01, 5.01, 5.05, 5.04, 5.07, 5.08, 141.1–141.5; 348/135; 702/159

(56) References Cited

U.S. PATENT DOCUMENTS

| | | | | |
|---|---|---|---|---|
| 4,727,259 A | * | 2/1988 | Halvis | 250/559.38 |
| 4,794,262 A | * | 12/1988 | Sato et al. | 250/559.22 |
| 5,835,204 A | * | 11/1998 | Urbach | 356/4.01 |
| 5,892,575 A | | 4/1999 | Marino | 356/5.01 |
| 6,323,942 B1 | * | 11/2001 | Bamji | 356/5.01 |

* cited by examiner

Primary Examiner—Que T. Le
Assistant Examiner—Thanh X. Luu
(74) Attorney, Agent, or Firm—Koppel, Jacobs, Patrick & Heybl

(57) ABSTRACT

A method and apparatus three-dimensionally images a subject scene by first illuminating it with a laser pulse, then receiving reflected light from the scene using an optical system and a pixellated array or photodetectors operating in a linear mode. The distances to the various surfaces in the scene are determined by determining the relative times of arrival of the reflected photons at each pixel on the photodetector array. Based on the light detected and its time of arrival at each pixel, a three dimensional image is constructed and displayed. High sensitivity photodetectors operating in a linear, non-geiger mode are preferably integrated with a high-gain, fast charge amplifier and a timing circuit at each pixel, enabling image acquisition in as few as one pulse. A multi-pulse embodiment allows more accurate "vernier" depth measurement, with a small number of pulses.

3 Claims, 13 Drawing Sheets

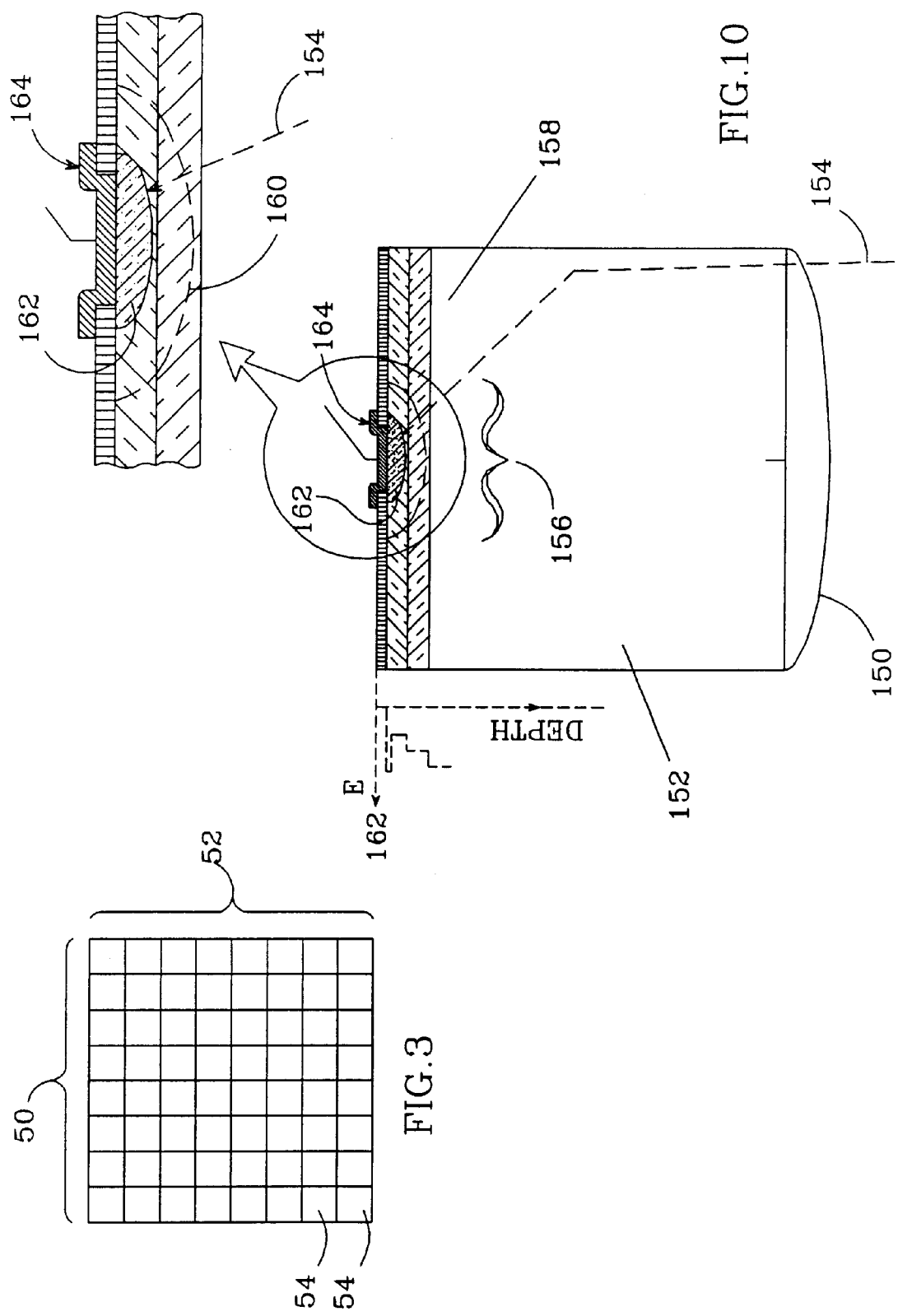

RANGING THREE-DIMENSIONAL LASER IMAGER AND METHOD

BACKGROUND OF THE INVENTION

1. Field of the Invention

This invention relates to imaging of objects by laser radar and more particularly to ranging or three-dimensionally imaging laser radar using high-gain semiconductor detectors.

2. Description of the Related Art

Active optical methods for imaging objects are known, including laser techniques often referred to as LADAR (Laser Detection and Ranging) or "LIDAR" (Light Detection and Ranging). These methods are the optical analogues of the more well known microwave radar. In the optical techniques light (typically from a pulsed laser source) is directed toward an object of interest. Reflected light from the object is then typically gathered and focused to an image plane, where it falls on a photodetector. An array of photodetectors at the image plane can be used to detect a two-dimensional image frame, which can be further processed (often digitally) to enhance the image. If adequate light is gathered and the reflective emissions of the object are distinguishable from noise, an object can be identified by such a system.

Some LADAR systems also are capable of determining the distance to an object, for example by timing the travel time of light pulses sent round trip from a source to the object and back to a detector. However, adapting such systems to remote objects challenges the sensitivity and speed of available devices. The challenges are accentuated when a conspicuous light source is undesirable, as when the LADAR operator desires to remain covert.

In many laser imaging systems either the scanner or the receiver is scanned across the object, and multiple laser pulses are used to probe the contours of the object. Such systems are not particularly covert, as the multiple pulses can easily be sensed and the source thereby located.

Many of the known systems also suffer from other shortcomings. The photodetectors previously used have had relatively poor sensitivity and signal-to-noise ratio. Some require cryogenic cooling. Some offer poor ranging accuracy.

U.S. Pat. No. 5,892,575 to Marino (1999) discloses a system for imaging a scene using an array of monolithic light detectors operating in non-linear, Geiger mode. In one "scannerless" embodiment disclosed by the patent, a processor develops an image of the target scene based on the round trip travel times of object-reflected photons received by a photodetector array at multiple positions on the array. The patented system addresses many of the shortcomings of the prior art, but it is nevertheless subject to certain drawbacks. Geiger-mode photodetector operation is subject to high levels of thermal noise, reducing the signal-to-noise ratio undesirably. Thus, the detector commonly requires cooling (although not necessarily to cryogenic temperatures). Moreover, Geiger mode hypersensitivity may cause false alarms due to scattered light from the atmosphere triggering a detector response.

SUMMARY OF THE INVENTION

The invention three-dimensionally images a subject scene by illuminating it with a laser pulse, then receiving reflected light from the scene using a focusing optical system and a pixellated array of photodetectors operating in a linear, non-geiger mode. The distances to the various surfaces in the scene are determined by measuring the relative times of arrival of the reflected photons at each pixel on the photodetector array. Based on the light detected and its time of arrival at each pixel, a three dimensional image is constructed and displayed. High sensitivity photodetectors operating in a linear, non-Geiger mode are preferably integrated with a high-gain, fast charge amplifier and a timing circuit at each pixel, enabling image acquisition with as few as one pulse.

A multi-pulse embodiment allows more accurate, "vernier", measurement of the relative distance to scene features, using as few as two pulses. In another variation of the invention, the photodetectors in combination with the charge amplifier circuit can easily be switched to a passive mode, allowing a user to view the scene first without illumination, then switch to laser pulse illumination to acquire more scene information.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 3 is a (simplified) example of a rectangular, pixilated array layout which is suitable for the photodetector array of the invention;

FIG. 4b is a partially schematic sectional view of an alternate approach which can be used instead of FIG. 4a;

FIG. 10 is a sectional view and potential diagram of a photodetector diode suitable for use in the invention;

DETAILED DESCRIPTION OF THE INVENTION

Figure 1:
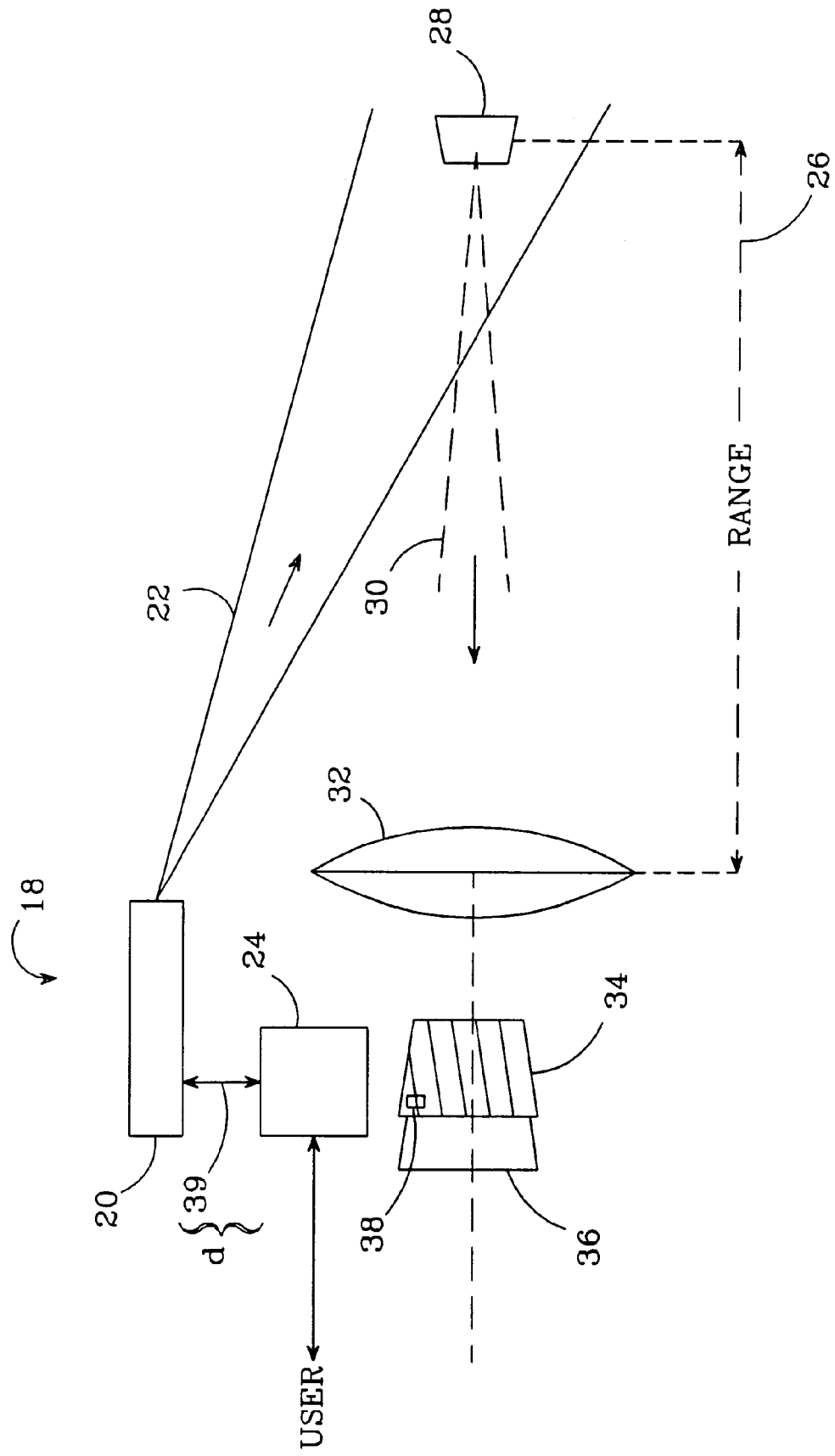
FIG. 1 is a schematic diagram showing an apparatus in accordance with the invention in its typical relationship to a subject scene.

The apparatus of the invention is most useful in an environment in which the shape and detailed position of a remote object is important. For example, the shape of a remote object may indicate whether it is a friend or a foe in a tactical military scenario. Or the object may be observed at night-time or in a dark environment. FIG. 1 shows a summary view of a typical arrangement of the apparatus (shown generally at 18) in relation to its subject. A pulsed illumination laser 20 emits a pulse of radiation 22 when triggered by control electronics 24. The pulse should preferably be of short duration, for example in the range of less than 1 nanosecond, most preferably in the range of less than 0.3 nanosecond, with an energy content preferably in the range of 7–200 milliJoules. It may be sufficient, however, that the leading edge or distinguishing feature of the pulse is well-defined on the order of 1ns. A suitable light pulses can be produced, for example, by a 1.55 micron wavelength pulsed laser source (producing radiation in the so-called "eyesafe" region of the spectrum).

The radiation 22 traverses a span 26 to illuminate a target object 28, which reflects some portion 30 of radiation back toward a receiving optical system 32. The receiving optical system gathers and focuses the radiation at a photodetector array 34, and the resulting electronic signals (from multiple pixels of the array 34) are read out by array readout electronics 36 (preferably fabricated in CMOS (complementary metal oxide semiconductor)). Control electronics 24 measure the time of travel for the light pulse from the source laser 20 to the object 28 and back to the detector array 34 (which is typically but not necessarily disposed nearby the laser 20), determining for each pixel in the array the time of travel. From the time of travel a distance is easily calculated (by dividing by the speed of light in the medium, which is generally air). By determining the distance for the light collected at each pixel, a picture of the object 28 is developed, including the depth information from the various surfaces of the object 28.

The optical system 32 (symbolized by a lens icon in FIG. 1) is suitably a telescope adapted to the wavelength of the light source. A Newtonian or similar telescope with diameter of 10 centimeters and a focal length of 25 centimeters (providing an aperture of F 2.5) will be adequate to allow viewing of scenes up to (approximately) 25 km distant from the receiver/laser position, assuming a 181 millijoule laser pulse and a beam divergence of 0.14 degree.

Although the laser 20 is often conveniently located near the optical system 32, photodetector 34 and readout electronics 36, in some applications it is instead desirable to remove the laser 20 some distance d from these other systems. The latter arrangement has the advantage that the receiver does not allow the target (subject scene) any indication of the receiver's position. In a hostile environment a laser pulse might be located and draw retaliation, but the remainder of the imaging apparatus would remain undetected. In such an application, it is desirable that the relative position of the laser 20 be known with respect to the optical system 32 and the photodetector 34, in order to triangulate the position of the subject scene to align the optical system to view the same scene which the laser illuminates. Communication between the laser 20 and the control electronics 24 is accomplished by a wired or wireless communication link 39. For multiple pulse approaches it may not be necessary to know the location of the laser precisely, provided the time delay between the pulses is known beforehand.

Figure 2:
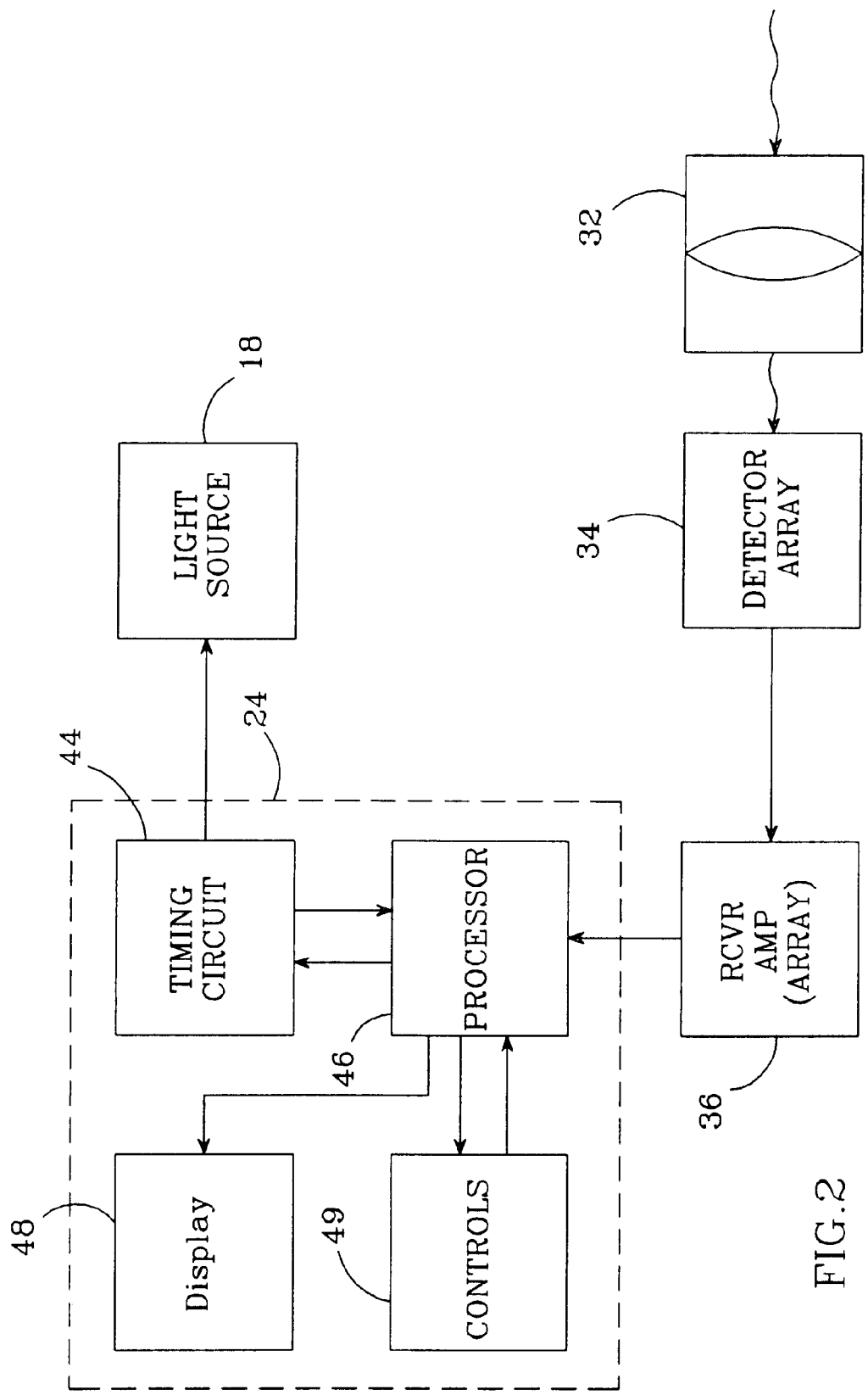
FIG. 2 is a block diagram of an apparatus in accordance with the invention.

The apparatus 18 is shown in block diagram form in FIG. 2. The pulsed laser 20 (including driving, tuning, and pulse shaping electronics and optics) emits a pulse of light toward the subject scene 28. The optical system 32 receives, gathers, and focuses the light reflected from the subject scene 28 onto the photodetector array 34, which converts the received light into electrical signals. Readout electronics 36 latch and readout the pixel signals. The readout electronics 36 preferably include an array of novel receiver amplifiers (preferably in one-to-one correspondence with the photodetector pixels). The pixel signals are received by the control electronics 24, which include: a timing circuit 44 which triggers the laser light pulse and initiates timing of the light pulse's time of travel (for each pixel); a processor 46, which controls the timing circuit and processes the image data from the readout electronics 36; a display 48 for viewing the image developed by the processor based on the signals from the readout electronics 36; and user controls 49 for governing the operation of the apparatus (typically via manual controls).

FIG. 3a shows one embodiment of an array of photodetectors, in simplified form. A rectangular matrix of only eight columns 50 and eight rows 52 of pixels 54 is shown, to maintain clarity in the illustration. However, in an actual apparatus a matrix of at least 64×64 rows by columns would be preferred, with larger matrices most preferred for better resolution. A suitable 64×64 array can be fabricated with dimensions of approximately 1.28 mm by 1.28 mm, for example. Although rectangular photodetector matrices are most common, other geometrical arrangements can be employed and are also within the scope of the invention.

Figure 4A:
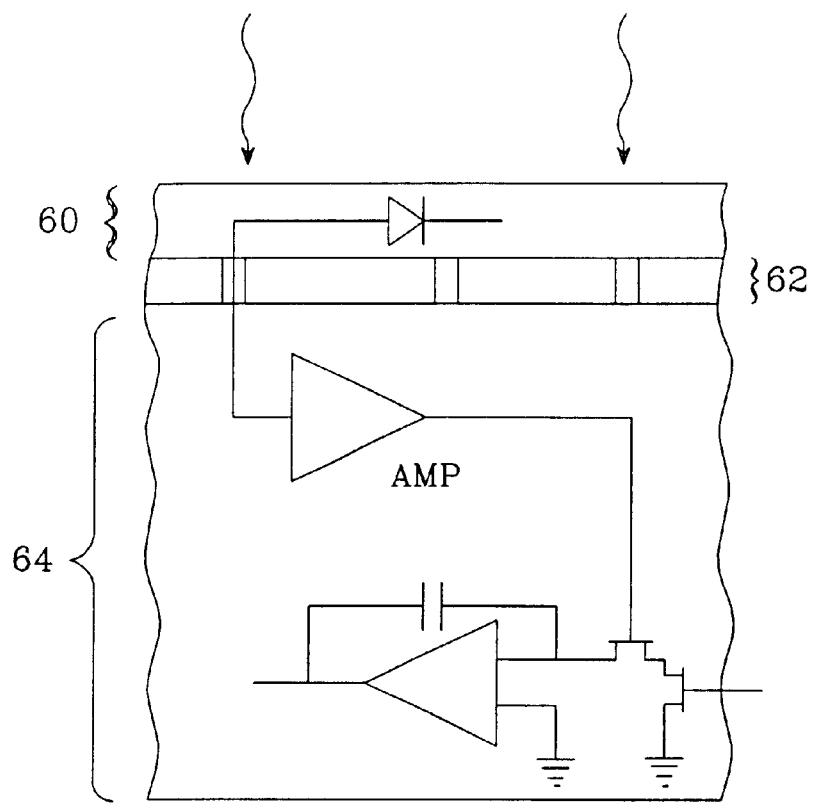
FIG. 4a is a partially schematic sectional view of the layers of materials in an interconnected, multilayer fabrication approach to integration of the photodetectors, receiver circuits, and timer circuits of a single pixel.

It is highly preferable that the photodetector at each pixel be integrated with its own associated amplifier and integrator/latch circuit (taken together, the readout electronics 36). One arrangement which accomplishes this is shown in FIG. 4a. A top detector layer 60 in which the photodetectors are fabricated is bonded via interconnects 62 (typically indium) to an amplifier layer 64, which buffers and amplifies the photodetector signal. Typically the photodetector 60 is fabricated in HgCdTe or InGaAs. The amplifier layer 64, which is most suitably fabricated in CMOS (but could be fabricated in another technology such as GaAs or InGaAs or InP), optionally also includes, for each pixel, an integrator (with reset switches) and latch. The details of the amplifier layer circuitry are discussed below in connection with FIGS. 5 and 6.

Figure 4B:
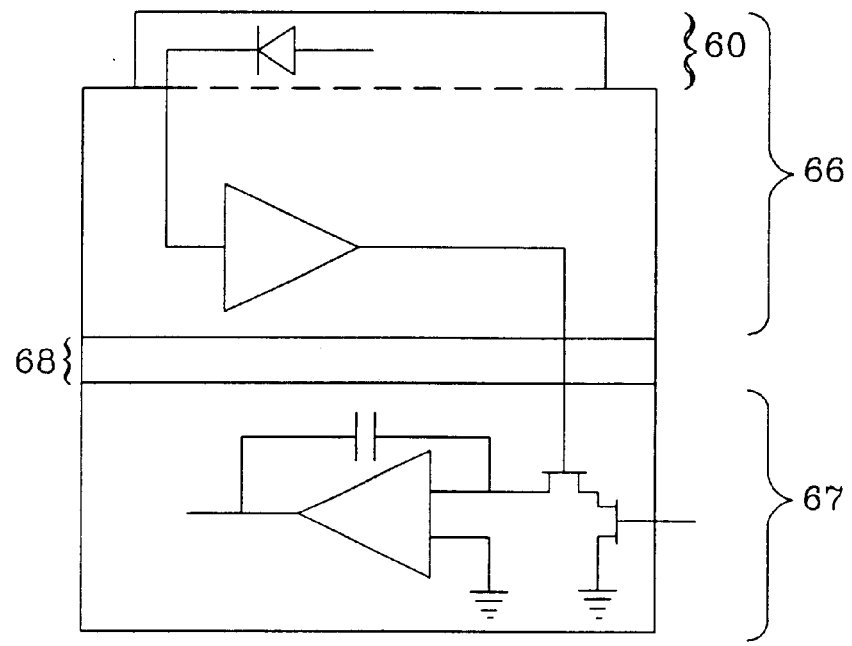

In the alternate structure shown in FIG. 4b, the detector layer 60 is fabricated in the same materials as the amplifier circuits, preferably in either InGaAs or GaAs. This approach eliminates the need for extra semiconductor processing and substrate removal in the case where the amplifier is fabricated in the III-V technology rather than CMOS. The amplifier and detector layers (together layer 66) is then combined by wafer transfer with a CMOS layer 67 to which it is connected by interconnect layer 68. The CMOS layer 67 preferably includes an integrator, switch, and latch as well as multiplexing circuitry to read out the signals from all the pixels in a serial video stream. A suitable wafer transfer technique is described in U.S. Pat. No. 5,627,112.

Figure 5:
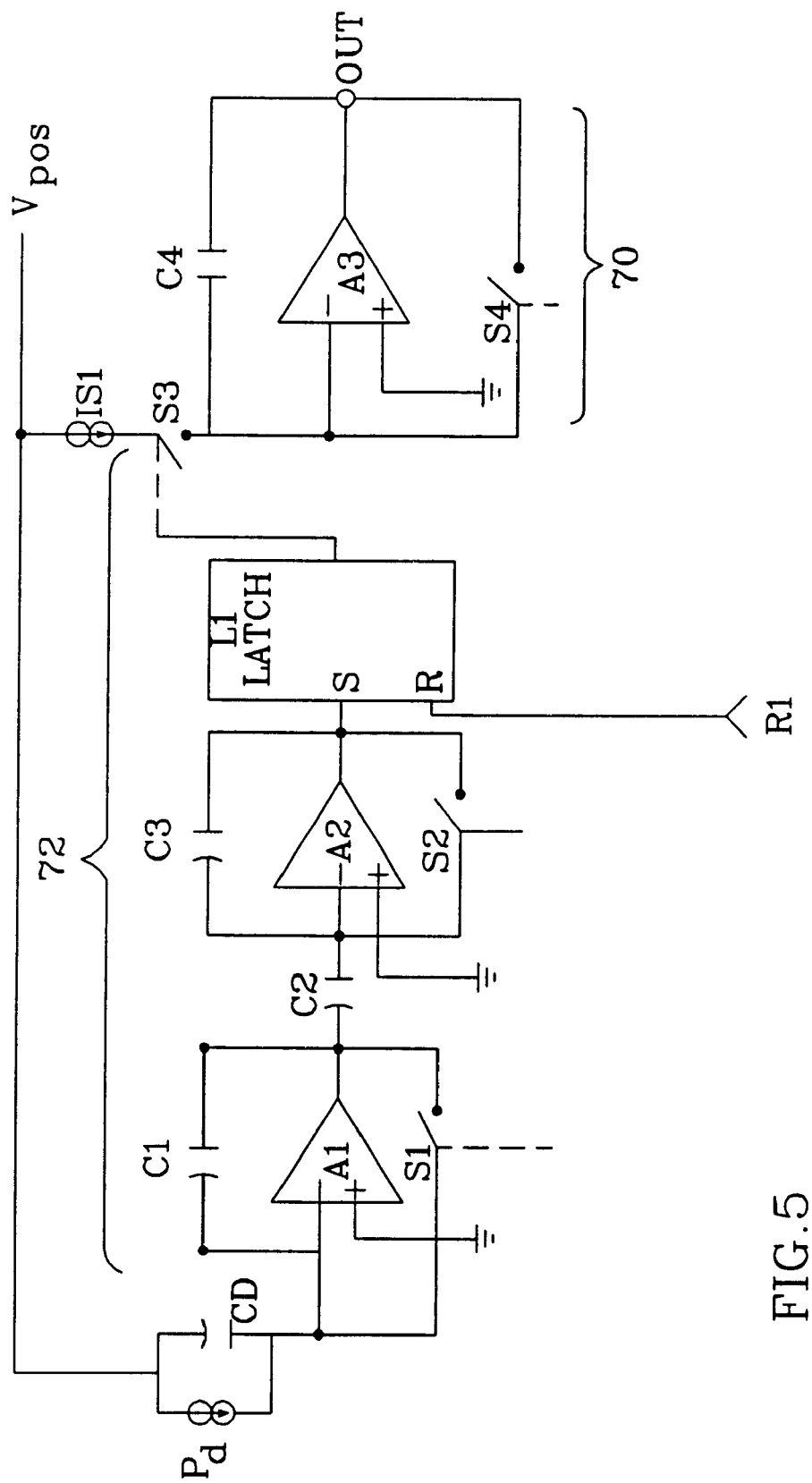
FIG. 5 is a block level schematic diagram of a photodetector amplifier and timer circuit which can be used in the invention.

FIG. 5 is an amplifier block diagram of an individual pixel's readout electronics 36. Input signal is provided by an associated photodetector Pd (shown with associated intrinsic capacitance Cd). A two stage circuit configuration is shown, but fewer or more stages could be used. The input signal is amplified by an input charge (capacitive transimpedance) amplifier stage A1, which is configured essentially as an inverting integrator with capacitance Cl in the feedback path. The charge amplifier should preferably provide very high charge sensitivity with very high speed, sufficient to measure delay of packet charge signal with a precision of approximately 1 nanosecond. To achieve these ends, a single ended cascode inverter is most suitable, using very high input impedance devices (an exemplary circuit is disclosed and discussed below, in connection with FIG. 6). The feedback capacitance C1 is typically the intrinsic capacitance of the devices, which is small (on the order of 5 femtofarads).

The output of the first stage amplifier is preferably capacitively coupled (via capacitor C2 on the order of 100 femtofarads) to a second stage inverting charge amplifier A2, shown with intrinsic capacitance C3 in the feedback path. The second stage provides additional gain. The output of the second stage amplifier A2 drives a latch L1, which is preferably fast regenerative comparators cross-connected in a latch configuration (one such circuit is shown below in FIG. 6).

High speed semiconductor switches S1 and S2 are provided to reset the first and second amplifier stages for initialization. These switches are closed to initialize the circuit by discharging any dark current or leakage charge buildup across capacitors C1 and C3.

An integrator 70 (including amplifier A3 and capacitor C4), driven by a constant current source IS1, provides a means of timing the arrival of photons at the photodetector Pd. Initially, the integrator 70 is reset by a signal R1 from timing electronics 44. The reset signal closes the switches S1, S2 S4, and R thereby discharging the capacitors C1, C3 and C4 and resetting the latch, L1. At a predetermined time (t(0)) with known temporal relationship to the laser pulse firing event, the switches are opened and the integrator 70 begins to integrate.

When sufficient charge is detected and amplified, the output of latch L1 goes high and opens a switch S3, thereby interrupting current from a constant current source IS1 into an integrator circuit (the amplifier A3 and feedback capacitor C4). The voltage at OUT is thereby latched to a level proportional to the elapsed time from t(0) to the time of arrival of the photons at Pd.

It is highly preferable that the input charge amplifiers and high speed latch (collectively designated as the receiver amplifier 72) be extremely sensitive and extremely precise in time response. For example, a sensitivity in the neighborhood of $5 \times 10^{15}$ Volts/Coulomb is desirable, which is equivalent to approximately 0.8 millivolt/electron. An exemplary circuit which can fabricated in CMOS to provide these characteristics is shown in FIG. 6.

Figure 6:
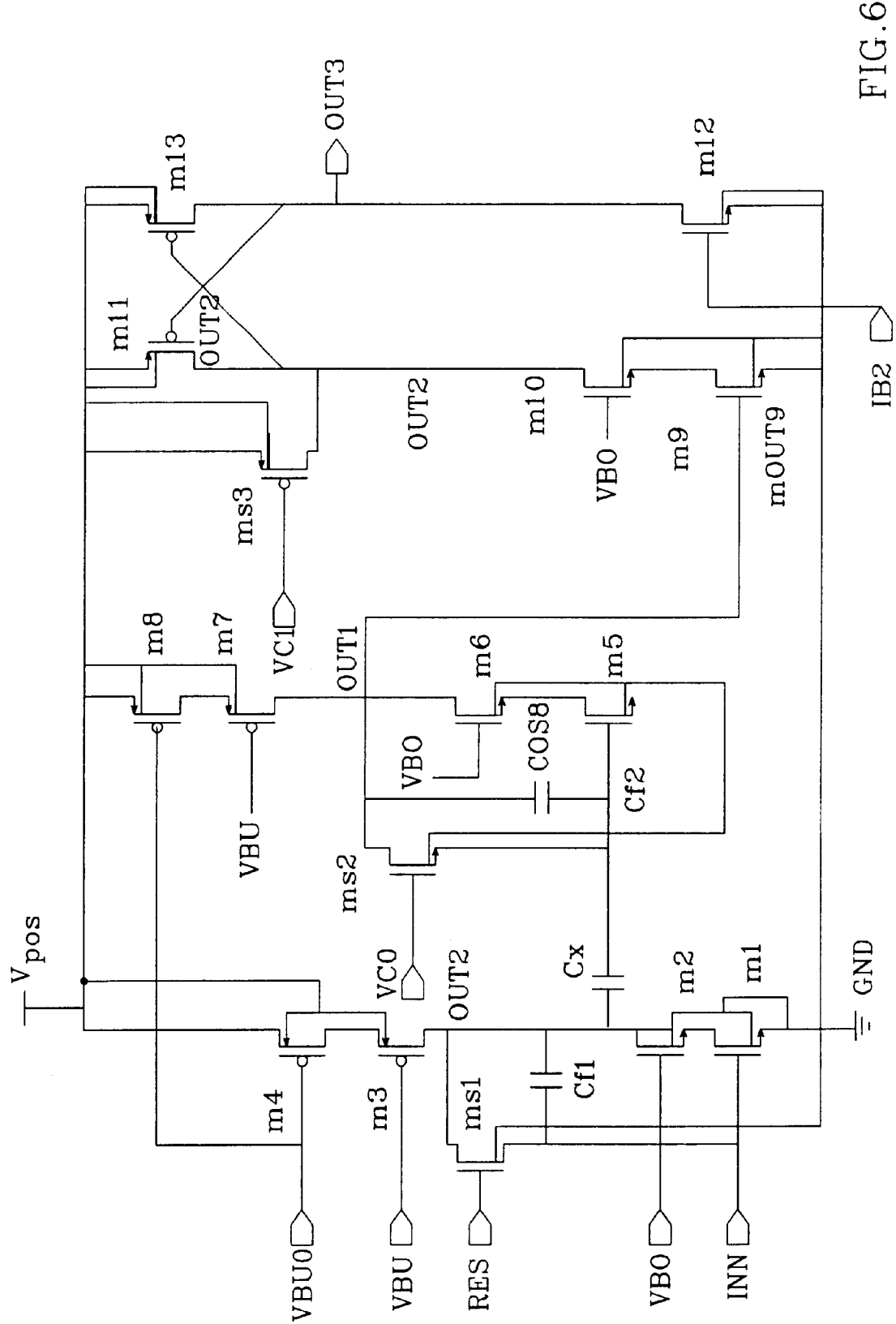
FIG. 6 is a component level schematic diagram of a particular circuit which can be used as the amplifier and latch stages of FIG. 5.

Referring to FIG. 6, the four transistors m1, m2, m3, and m4 connected and biased as indicated constitute FIG. 5 amplifier A1; and the four transistors m5, m6, m7 and m8 connected and biased as indicated constitute FIG. 5 amplifier A2. The two NMOS transistors m1 and m2 are connected in a cascode amplifier configuration which amplifies the signal from a photodetector Pd connected to input INN. The PMOS transistors m3 and m4 provide a current source bias for the m1 m2 cascode circuit. Current bias is set by voltage references applied at VBUO, VBU, and VBO from a conventional voltage reference circuit (not shown). A bias point providing quiescent current of approximately 10 microamps in the source/drain circuit of m2 is suitable.

The reset switches S1 and S2 of FIG. 5 are implemented as transistors ms1 and ms2 in FIG. 6. These NMOS transistors are operated in switching mode, with the switches closing on rising edge of the pulses at RES and VC0, respectively. These switches provide a means of initializing and resetting the charge amplifier (first and second stages) as discussed below.

As mentioned above transistors m5 and m6 (augmented by transistors m7 and m8) provide a second stage amplifier, also a cascode configuration, which further amplifies the output of the first stage "m1-m2" amplifier. Transistors m7 and m8 provide the bias current to the m5-m6 cascode amplifier, and are biased by a voltage reference circuit which sets the voltages VBUTO, VBU, and VBO as previously discussed in connection with the first amplifier stage. The output OUT1 of the second stage amplifier is further amplified by the input stage (transistors m9 and m10) of the latch consisting of transistors m9, m10, m11, m12 and m13 with the latch reset (R in FIG. 5) being transistor m3. When the voltage at the drain of m10 (OUT2) is pulled low, it causes m13 to conduct, pulling up voltage OUT3 at the drain of m13. This condition turns off m11, thereby setting the m11-m13 latch circuit into an "output-high" state. The latch remains set in the output-high state until reset by a low level at VC1, which causes m11 to conduct, pulling up the voltage at OUT2 and resetting the latch into the OUT3-low state.

Closing the three switches MS1, MS2 and MS3 resets the circuit of FIG. 6. To initialize the circuit, the three switches should preferably be opened in a specific sequence and timing, to reduce initial charge injection from the initialization. Specifically, MS1 should open first, then MS2, then MS3. Preferably, the gate voltages RES and VC0 which open MS1 and MS2, respectively, should preferably be formed with approximately a 1 microsecond rise time. Additionally, the waveform used for RES should preferably lead the waveform used for VC0 by about 20 ns.

Figure 7:
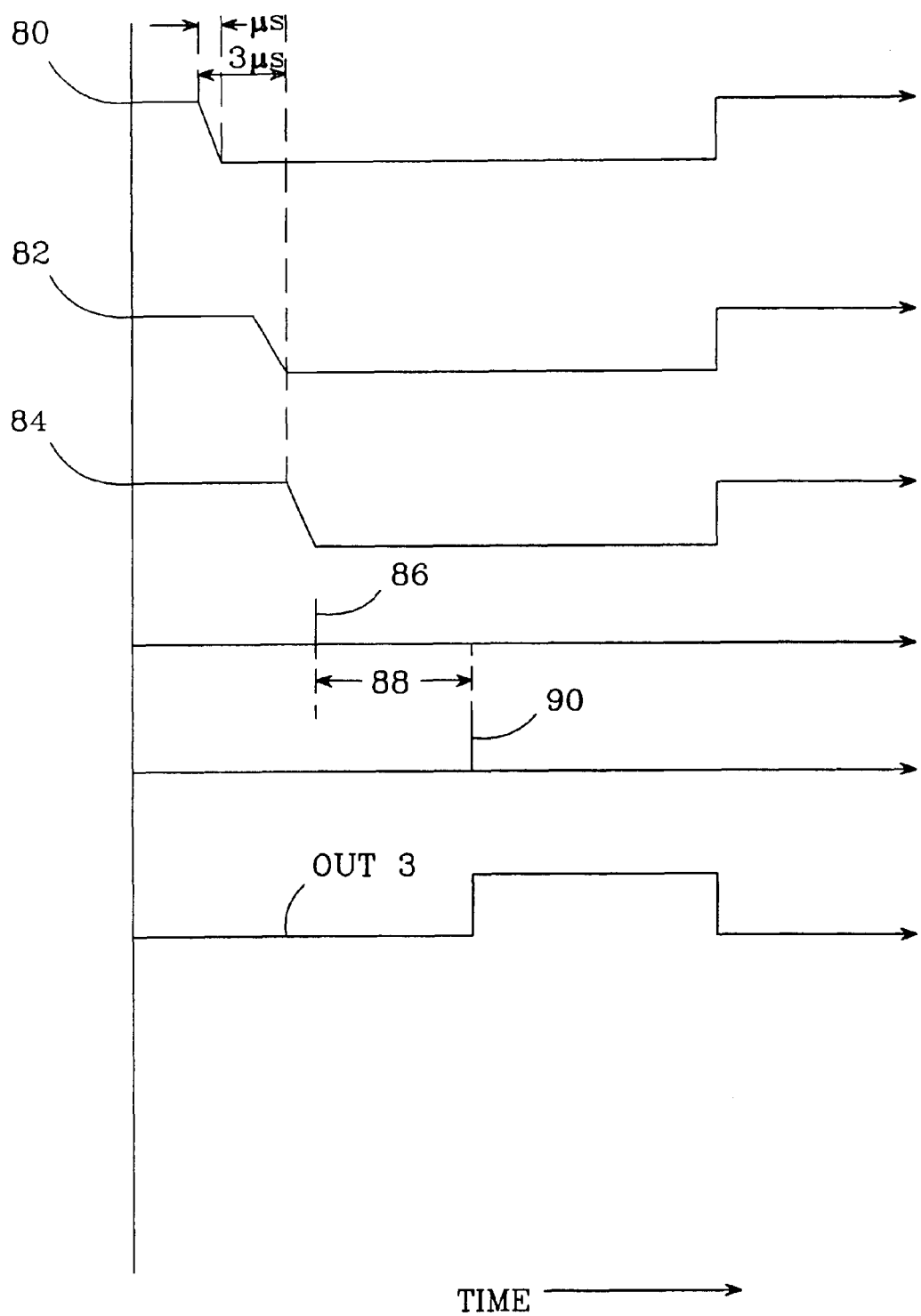
FIG. 7 is a timing diagram showing the sequence of events in one embodiment of the invention.

The timing diagram of FIG. 7 shows a typical timing sequence generated by the invention. Reset pulses 80 (RES in FIG. 6) and 82 (Vc0 in FIG. 6) are generated by the timing electronics (44 in FIG. 1) in the approximate relationship as shown, with 1 microsecond rise times and an approximate 20 ns lag between 80 and 82, followed by a third reset 84 which resets MS3, also generated by the timing electronics 44). Upon reset, and synchronized under control of the timing electronics 44, the laser pulse fires, indicated by pulse 86. After some transit time 88, during which a light pulse travels from the laser, to an object, and returns to the photodetector, a charge pulse 90 is detected. The output OUT3 responds, latching quickly up to its supply voltage as shown. If desired in a particular application, the process can be repeated by resetting (by reset pulses identical to previous reset pulses 82, 83 and 84). However, in many applications it is desirable to acquire image data using a single, non-repetitive pulse, or a short series of pulses. Such an approach is resistant to detection and location (countermeasures) from the subject, which may include hostile personnel or devices.

Figure 8:
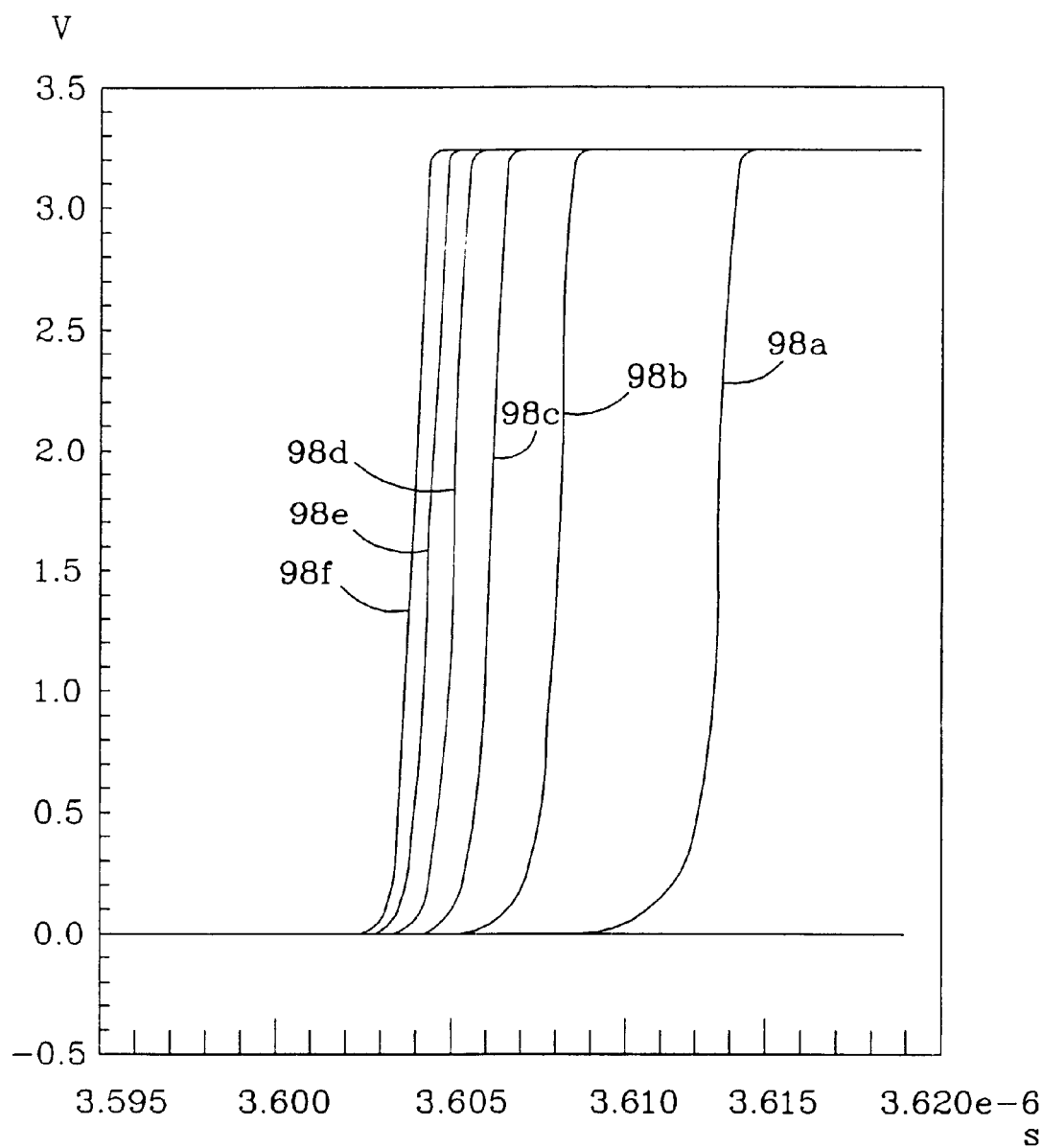
FIG. 8 is a plot of four voltage vs. time curves for the output of the latch of FIG. 6, showing its transient response to six respective levels of photonic excitation.

It is generally desirable that the receiver amplifier 72 have transient response rise times which are not sensitive to the amplitude of the input signal. In other words, to detect the distant of objects the device rise times should not depend on the reflectivity of the subject, which would otherwise introduce uncertainty into the measurement of elapsed time. The circuit shown in FIG. 6 provides very low variation in rise time with different amplitude inputs, as demonstrated in FIG. 8, a simulation of transient response. Six curves are shown, labeled 98a–98f, corresponding to charge inputs of 187 electrons (98a), 337 electrons (98b), 487 electrons (98c), 637 electrons (98d), 787 electrons (98e) and 937 electrons (98f), producing varied rise times as shown responsive to the various input charges according to the table:

TABLE 2

| Charge e- | Relative switching time |
|---|---|
| 337 -> 487 | 2 ns |
| 487 -> 637 | 1.3 ns |
| 637 -> 787 | 0.75 ns |
| 787 -> 937 | 0.5 ns |

As the curves 98a–98d indicate, for input photo-electron signals above 300, all curves are within +−1.2 nanosecond of delay, which corresponds to a distance uncertainty of approximately 1 foot (0.3 meters).

Figure 9:
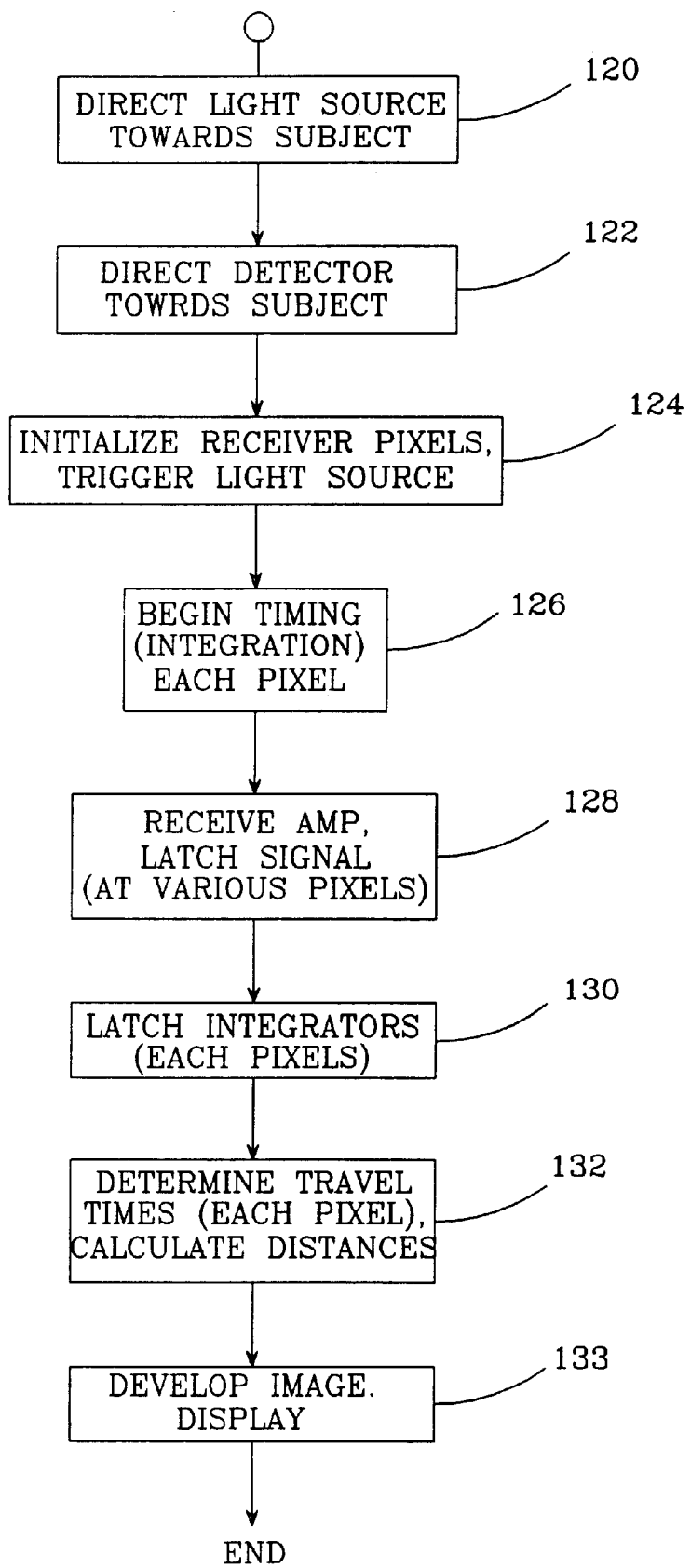
FIG. 9 is a flow chart of a method in accordance with the invention.

FIG. 9 shows a flow chart of a process preferably used under control of the processor 46 (in FIG. 2) to image objects by the invention. First the light source is directed toward a subject of interest, typically by manual positioning (step 120). Similarly, the detector is oriented toward the subject (step 122). Upon command from an operator, the processor 46 triggers the timing circuits 44 to initialize the receiver pixels and trigger the light source (together step 124), preferably according to the timing sequence previously discussed in connection with FIG. 7. At a time in known temporal relation to the time of light emission, the timing circuits begin timing (step 126). Preferably, but not necessarily, this timing is accomplished by a circuit such as the integrator 70 shown in FIG. 5 and discussed above. At some time after the light pulse is emitted, reflected light returns from the subject, is gathered and focused by an optical system, and is received (step 128) by the photodetector and receiver electronics. The output of the receiver electronics latches the integrator (for each pixel, at various times, step 130) or otherwise stops the timing for each pixel. The processor 46 then determines for each pixel based on the integrator voltage the time of travel for the light detected at that pixel and calculates the corresponding distance to the target portion imaged at that pixel (step 132). Based upon the calculated distances, the processor 46 then develops an image including the distance information and displays that image on the display device 48 (shown in FIG. 2). Note that a second pulse with a known different magnitude may be used to increase the precision of the distance measurement. This is done by examining the difference in delay between pulses of different magnitude. Those pixels which show significant differences are those which have low response intensity. Knowing the response characteristics of the pixels will allow correction to extract more precise depth from the low response pixels.

Many display schemes are known which can be used to visually present the distance information, including but not limited to color coding, gray scale coding, binocular displays, and computer generated perspectives.

The photodetector Pd used in the invention (at each pixel) should preferably be a semiconductor photodiode biased in its linear region, below the avalanche breakdown threshold. One semiconductor photodetector structure which can be operated suitably in such a linear, non-geiger detection mode is shown in cross-section in FIG. 10, in connection with an energy level diagram of the corresponding layers. Each pixel preferably includes a coextensive microlens 150 and transparent substrate layer 152, which focus incident light 154 into an active region 156 of the pixel. The incident light passes through an (optional) buffer layer 158, which is suitably fabricated on the order of 2 microns thick from a semiconductor material (preferably mercury telluride or similar material) which is transparent to the wavelengths of interest (typically around 1.5 micron wavelength). Photoelectrons produced in the depletion region (within dotted line 160) migrate under the influence of the junction electric field to the p-implanted, diffused, or grown junction 162 and are picked up by a reflecting, conductive contact 164 to provide a signal. Other such structures are possible, including avalanche photodiodes with sufficient uniformity in responsivity (gain times quantum efficiency) and low noise at the operating bias, provided that the structure used provides good quantum efficiency, typically >0.6 electron/photon. Pixel sizes of 20×20 micron areas are suitable. Overall photonic efficiency can be improved by the use of focusing microlenses to concentrate photonic energy in photodetector areas of the pixels, as is well known. Microlenses can also be used to allow larger pixel size without increasing detector capacitance or reducing sensitivity.

Figure 11:
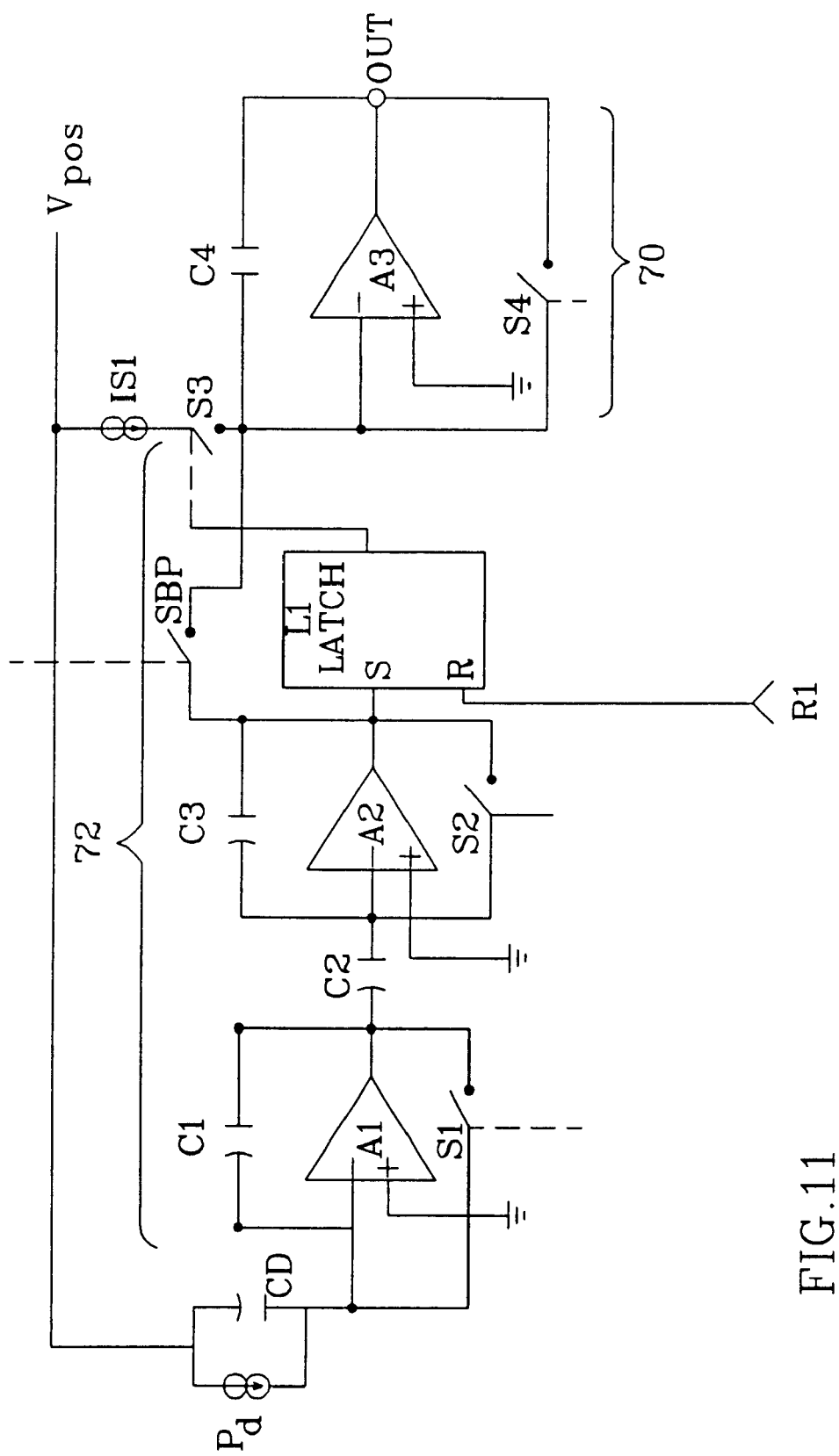
FIG. 11 is a block level schematic diagram for a circuit variation which can be used in an alternate embodiment to allow passive imaging by the same photodetectors used in the active mode.

An alternate embodiment of the invention features switchable modes, adding versatility. One exemplary circuit which can be used in the alternate embodiment is illustrated in FIG. 11. The Latch L1 is bypassed by switch SBP which (when closed) couples the output of A2 to the input of A3. Switch S3 should be open when operating in the alternate mode, disconnecting the current source IS1 from the input of A3. Thus, in the alternate mode the A3–C4 integrator integrates the signal from the input stages, accumulating the input over time. The switchable circuit shown performs the same functions as described above, in connection with FIG. 5, but additionally is capable of operation in a passive or pulse integrating mode, by temporarily sacrificing the distance measurement. In a passive mode, the circuit of FIG. 11 integrates signal proportional to light received from the subject scene. By bypassing the latch L1 in FIG. 5 (for example, by using MOSFET switches to connect OUT1 to OUT3 and disconnect the latch from OUT3 in FIG. 6), the signal can be integrated until the integrator 70 is reset. The background light (thermal and other emissions) can be accumulated in this manner to yield a (two-dimensional) intensity image without depth measurement. This image can be formed from single laser pulses or ambient light, without any use of a light source. Also at the expense of the range information, multiple laser pulses can be accumulated to extend the range and sensitivity of the apparatus. Operation in purely passive collection mode using ambient light, has the advantage of being undetectable by the target, while collecting multiple laser pulses offers greater range but is detectable. When operating in non-ranging mode, with or without a light source, it is an advantage of the invention that the photodetectors can be operated in linear mode, yielding gray-scale or linear intensity information which aids a viewer in scene comprehension.

In a typical use of this alternate embodiment, the user might start surveillance of a subject area with passive mode, switching to full ranging and depth resolution mode when a target of greater interest is identified.

In another alternate embodiment of the invention, at least two pulses are used for improved depth resolution. In a typical application, the depth of the imaged scene is small compared to its range from the apparatus of the invention. Thus, to accurately image the depth in the scene, it is necessary to measure a small difference in elapsed time (corresponding to the varying depth or surfaces within the scene) in the context of a much longer elapsed time (corresponding to the much longer range to the scene from the emitter and back to the receiver). The problem of accurately measuring a small time difference in the context of a large total time is solved by using a first pulse, which starts all pixel timers when it is received (at any pixel), and a second pulse with known temporal relation to the first pulse to stop each pixel's timer when light is received at that respective pixel. This provides a "vernier" to allow improved time resolution.

Figure 12:
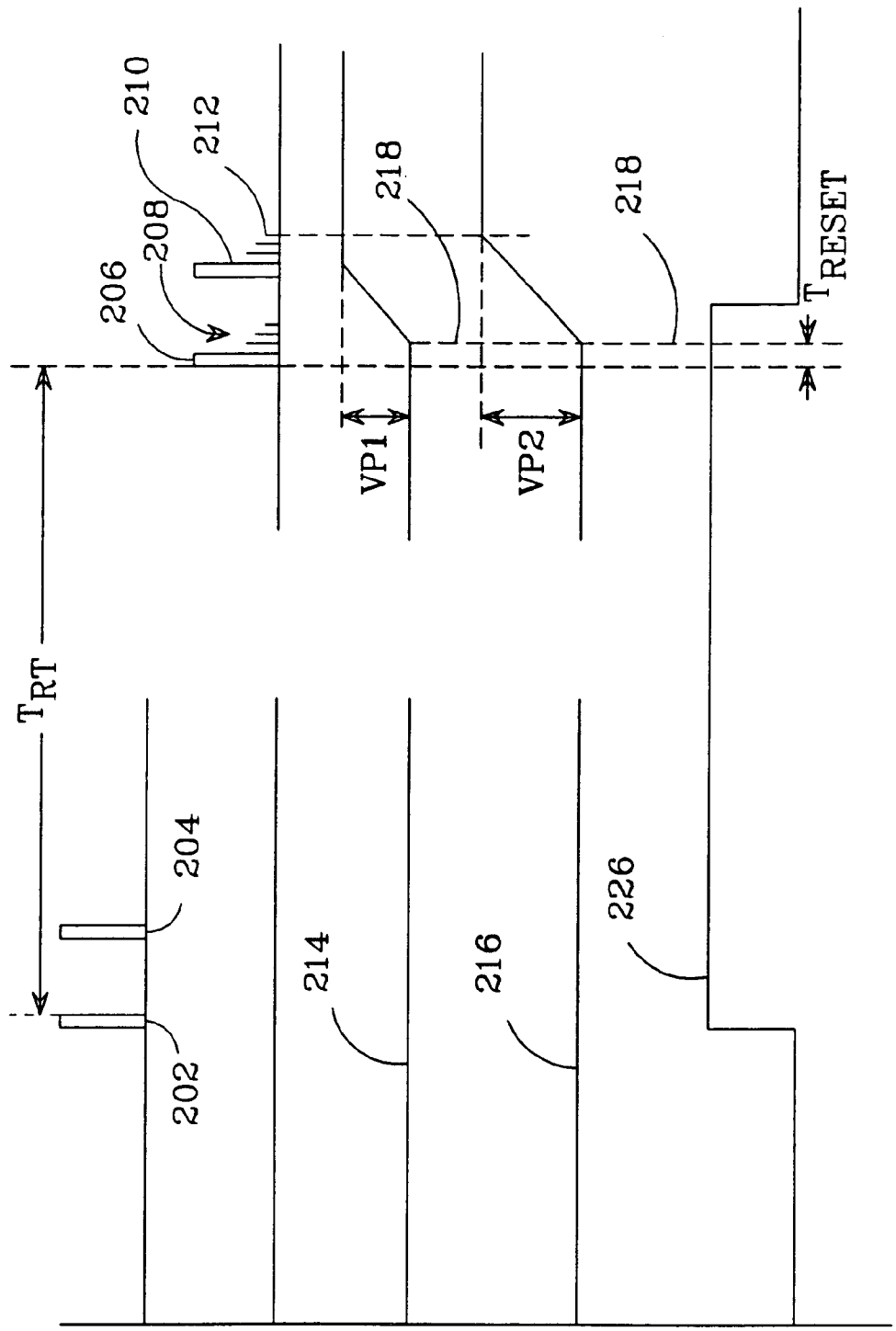
FIG. 12 is a timing diagram of an alternate method for determining the relative depth of scene features.

The timing sequence used by the two-pulse or "vernier" embodiment is illustrated in FIG. 12. The pulse sequence used is a variant of the timing diagram of FIG. 7. A first light pulse 202 is emitted, followed by a second light pulse 204. The delay between pulses 202 and 204 is preferably on the order of a few microseconds, which is long enough to allow the photo-receiver circuits to reset. The light pulses travel from the source to the subject scene and back to the receiver during time $T_{RT}$. (The horizontal time scale of the FIG. 12 has been intentionally distorted by greatly compressing the duration of $T_{RT}$ in order to fit the relevant events within the boundaries of the diagram). After $T_{RT}$ the reflection of the first pulse 204 returns. An initial reflection 206 (from a near surface of the subject scene) is closely followed by further reflections 208 from more distant surfaces. Next, the reflection 210 of the pulse 204 followed by further reflections 212 from more distant surfaces.

To accurately measure the depth of the various surfaces of the scene, in this embodiment a timer is started upon receipt 206 of the reflection from the closest surface of the subject scene (the first reflection received, at whatever pixel that occurs). Typically the timing is performed by integrating a constant current in the same manner shown in FIG. 5. Although the integrators are started in each pixel upon the receipt of pulse 206, the reset switches S1 and S2 are not opened until an appropriate delay has occurred to allow later returns from the initial pulse to die away. This may be accomplished with the existing above described circuit by emitting pulses on successive frames, with the return from the first frame being used to time the opening of the reset switch on the second frame. In this mode the current from the calibrated source is set much higher in the second frame to provide the vernier. To accomplish this same effect in a single frame, additional timing must be added to the timing generator and the reset of S1 and S2 must be separated from the Latch L1 reset R. Waveform 214 shows the output voltage at a nearest pixel P1. The output voltage starts from zero, and begins to ramp upward as the integrator accumulates charge, beginning from time 218 which is $T_{reset}$ after the reception of reflection 206. Pixel P1 receives an optical signal from pulse return 210, which latches the integrator at an output voltage VP1 by opening a switch (as in FIG. 5). Another pixel, arbitrarily denoted P2, receives an optical return 212 later, because it receives light imaged from a more distant surface of the scene. Accordingly, the voltage 216 at the integrator for P2 integrates for a longer time, reaching the voltage VP2 (higher than VP1). The processor 46 (in FIG. 2) then assembles an image based on the various voltages reached by the various pixels, as in the previously described embodiments.

One advantage of the "vernier" embodiment is the increased accuracy obtained because the integration takes place for a shorter period as compared with timing a pulse from emission to reception, allowing the use of higher currents in the integrators.

Similar advantages can be obtained, in a variation of the "vernier" embodiment, by simply disabling the timing integrators at all pixels (by shorting the capacitor, for example) for a user selectable period of time before starting the integration. In such an embodiment a clock outputs a measured disabling pulse, such as is shown at 226. The integrators at all pixels are disabled until clock pulse 226 falls, allowing a user to set an effective minimum or "front" range for the imaging device. Scenes in front of the preset minimum range will not contribute to the image.

In yet another embodiment of the invention, two pulses (or more) are used to provide a useful "look-behind" ability. In certain settings, it may happen that a subject scene has multiple "layers" of partially reflecting surface. For example, a large metallic object may be concealed behind a thin layer of netting or foliage, or a subject of interest might be partially or completely hidden under water or behind a partially transparent surface. In such a case, the signal return even at a single pixel might have multiple peaks, one from the nearer surface and another (at least one) from the more distant surfaces (the "behind surfaces").

Figure 13:
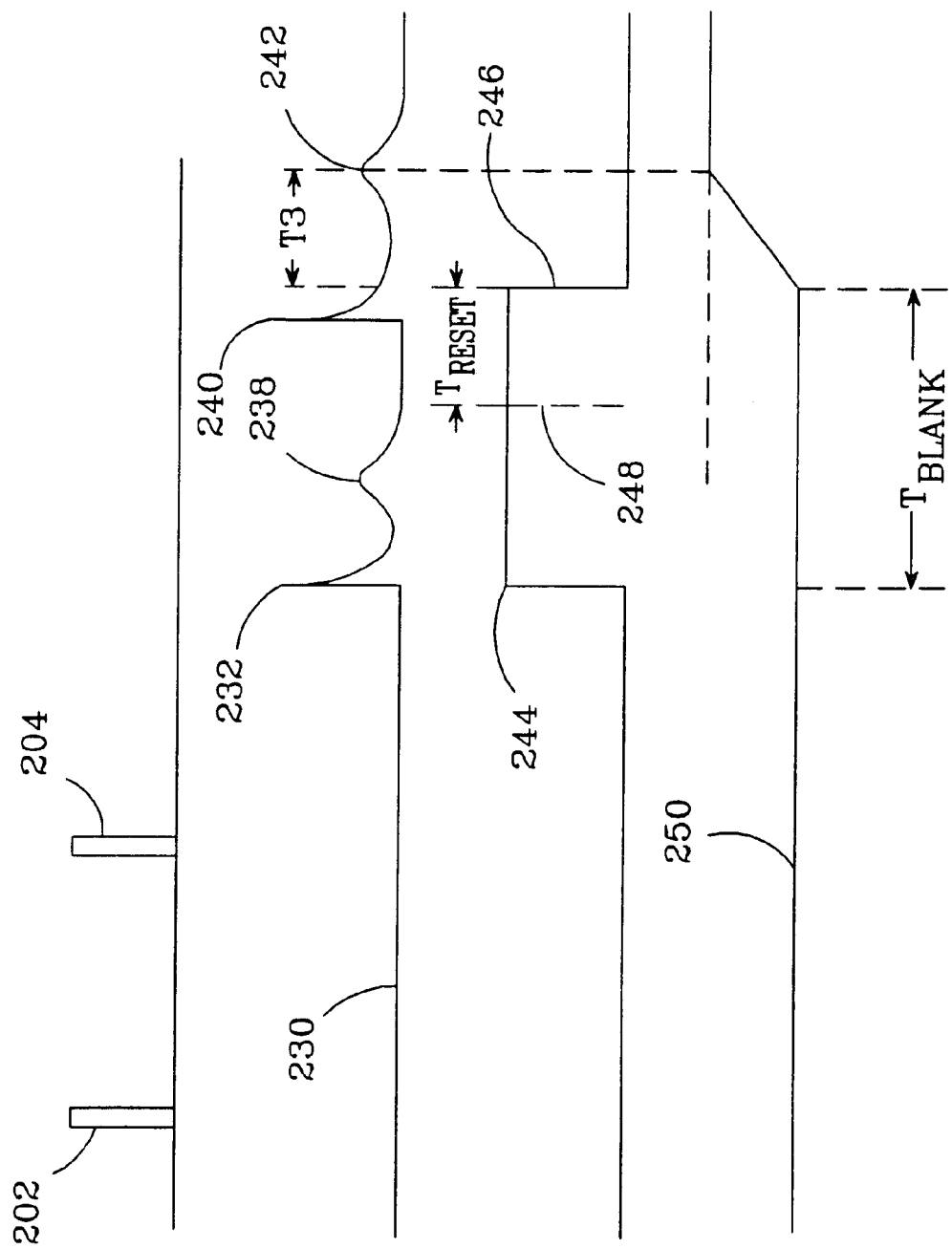
FIG. 13 is a timing diagram showing the sequence of events in another alternate method which can be used in a "look-behind" mode to penetrate partially obstructing front surfaces and image the objects behind the obstruction.

To image such scenes, an adjustable blanking time is used to disable all the pixels' receivers for a predetermined time (which may be based on the return from a previous frame), to allow the return from the nearer surface to pass by the temporarily disabled receiver. Referring to FIG. 13, a suitable timing sequence is shown which can be controlled by programming processor 46 to command the indicated timing sequences from timing circuits 44.

Optical pulse 202 is emitted first, followed shortly thereafter by second optical pulse 204, as in the previous figures. The optical return 230, which indicates the return from a single representative pixel P3, shows multiple peaks from each optical pulse emitted. A first peak 232 corresponds to the reflection from a near, concealing surface of the subject scene; a second peak 238 corresponds to a second, deeper reflection from a farther surface of the same scene, received by the same pixel because the two surfaces are directly in line with the optical line of sight. Similarly, second pulse 204 produces two returns 240 and 242, respectively from a nearer and a farther surface of the subject scene.

To "look behind" the near surface of the scene, a blanking pulse 244 is provided which keeps pixel 3 in the reset mode (S1, S2, and R switches all closed) until time 246 when the reset switches are opened rapidly in the above mentioned sequence (82-83-84 in FIG. 7). The blanking period set by pulse 244 can suitably be set slightly greater than the shortest measured round trip time at any pixel of the reflection from the first pulse 202, which establishes a near extreme for the object range. Thus, the blanking period of pulse 244 is sufficiently long that the receiver is still disabled when pulse 240 arrives, so this pulse is ignored. Effectively, the receiver is blinded to all pulses returning before the reset time 246, which sets a near boundary on the detectable scene. Waveform 250 represents the integrator voltage at a a pixel disposed to receive return 242. By adjusting the length of blanking period $T_{blank}$, the near boundary can be adjusted closer or farther from the apparatus. By setting the boundary just beyond the closest return, the invention allows a user to look behind the nearest surfaces, which may disguise a subject scene of greater interest. For example, a large vehicle parked behind partial foliage or getting could be imaged by setting the boundary beyond the screening foliage or netting. The limit of the distance resolvable behind the obscuration is determined by the time required to reset the pixel after the reset switches are opened.

In yet another variation, the invention repeats the timing sequence of FIG. 13 in (at least one) successive time frames, incrementing in each successive frame the length of $T_{BLANK}$. Each frame's return is used to construct an image corresponding to object projections on successively more distant surfaces, corresponding to the successively increasing $T_{BLANK}$. An ensemble of image frames results, which is used to construct a three-dimensional image of the object, including obscured features revealed by the "look-behind" capability.

Figure 14:
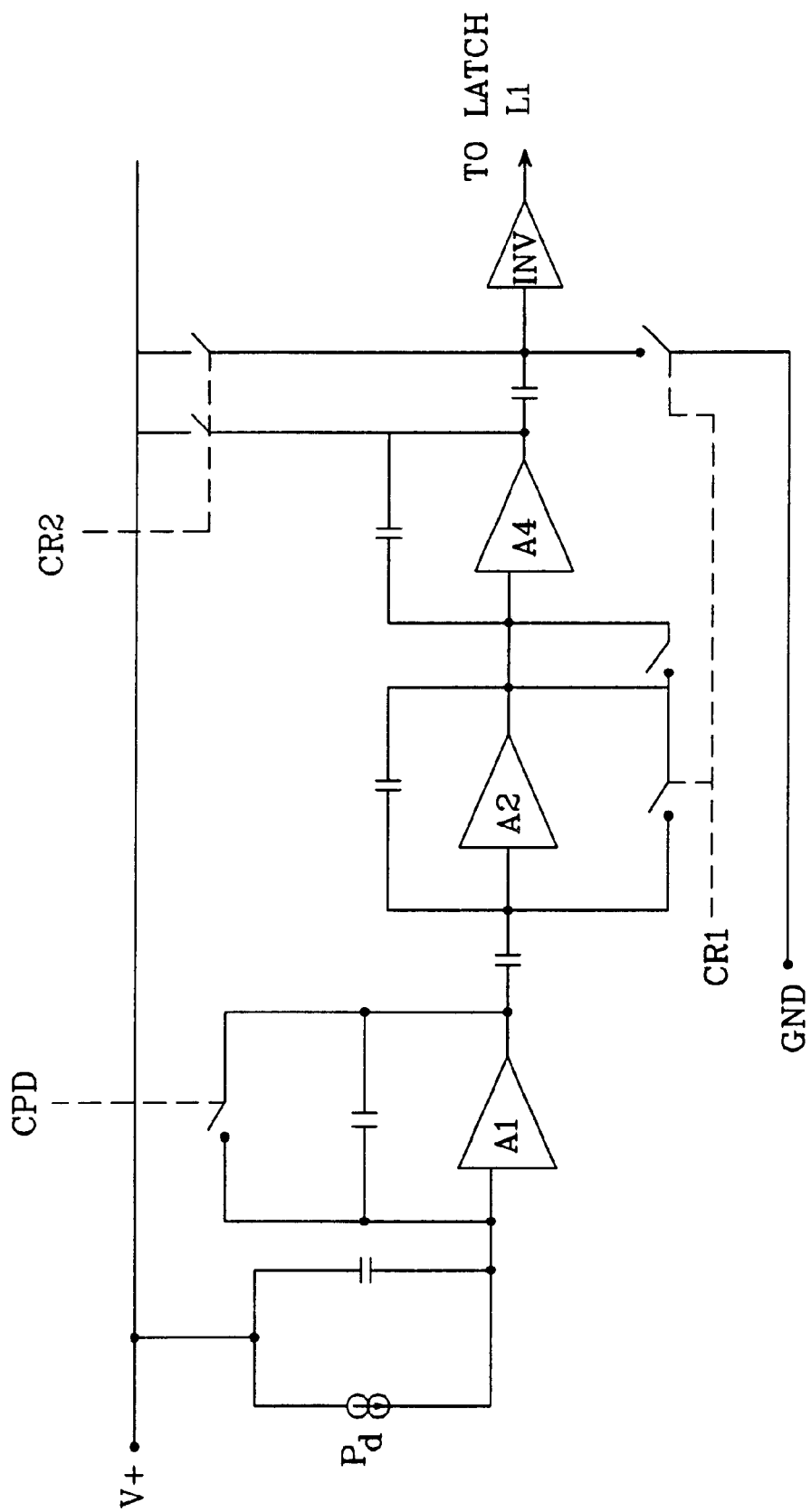
FIG. 14 is a circuit variation which can be optionally used in the photoreceiver charge amplifier for applications in which a faster enabling transition is desired.

Because the depth resolution in the "look-behind" mode is dependent on the enabling transition time for the photoreceiver pixels, in such an application a quickly enabled circuit is preferred. FIG. 14 shows a circuit variation which is very similar to the charge amplifiers of FIG. 5 but which includes an additional amplifier stage A4 between A2 and the latch L1. The circuit is enabled by opening CR0, CR1 and CR2, preferably in that order. This circuit provides faster transition from the disabled to the enabled state, and would be suitable in an application in which such fast enable time is highly desirable.

While several illustrative embodiments of the invention have been shown and described, numerous variations and alternate embodiments will occur to those skilled in the art. For example, any or all timing functions described above as performed by integrators could alternatively be performed by counters or other known timing circuits, without departing from the scope of the invention. Such variations and alternate embodiments are contemplated, and can be made without departing from the spirit and scope of the invention as defined in the appended claims.

We claim:

1. A method of imaging an object, comprising the steps of:

emitting a first pulse of light from a light source toward the object;

a predetermined interval after emitting said first pulse, emitting a second pulse of light toward the object;

arranging a photodetector array of multiple photodetector pixels to receive reflections of said first and second pulses;

detecting the first arrival at any of said multiple photodetector pixels of reflected light returned from the object;

measuring, for each of multiple photodetector pixels, an elapsed time between a time of said first arrival until a later time of a second return, said second return at each pixel being the return of light from said second pulse after reflection from the object; and constructing an image of the object based upon the respective elapsed times measured for said multiple pixels;

wherein said predetermined interval is shorter than the round trip travel time for light from the light source to the object and back to the photodetector array.

2. The method of claim 1, wherein said photodetector array is operated in a linear, non-Geiger mode.

3. The method of claim 1, wherein the step of measuring the elapsed time comprises:

amplifying signals from said photodetector with a cascode charge amplifier having a transient rise time which is substantially independent of the amplitude of the signal;

starting a timing circuit at a start time based upon the earliest detection of reflected light returned from the object;

stopping said timing circuit at a stop time upon the detection of a return of said second pulse after reflection from the object; and reading the timing circuit to determine the time elapsed between said start and said stop times.

* * * * *